US012722903B2

(12) United States Patent
Kamigaito et al.

(10) Patent No.: US 12,722,903 B2
(45) Date of Patent: Sep. 1, 2026

(54) COMBINATION WEIGHING APPARATUS

(71) Applicant: Ishida Co., Ltd., Kyoto (JP)

(72) Inventors: Satoru Kamigaito, Ritto (JP); Hideshi Miyamoto, Ritto (JP); Osamu Hirose, Ritto (JP); Toshiharu Kageyama, Ritto (JP)

(73) Assignee: Ishida Co., Ltd., Kyoto (JP)

(*) Notice: Subject to any disclaimer, the term of this patent is extended or adjusted under 35 U.S.C. 154(b) by 69 days.

(21) Appl. No.: 18/653,530

(22) Filed: May 2, 2024

(65) Prior Publication Data

US 2024/0391700 A1 Nov. 28, 2024

(30) Foreign Application Priority Data

May 22, 2023 (JP) ................................ 2023-084175

(51) Int. Cl.
*B65G 31/04* (2006.01)
*B65G 43/08* (2006.01)
*B65G 47/44* (2006.01)

(52) U.S. Cl.
CPC ............ *B65G 31/04* (2013.01); *B65G 43/08* (2013.01); *B65G 47/44* (2013.01); (Continued)

(58) Field of Classification Search
None
See application file for complete search history.

(56) References Cited

U.S. PATENT DOCUMENTS 5,074,436 A * 12/1991 Inoue .................. G01G 13/248 222/196
10,472,181 B1 * 11/2019 Eto ....................... B65G 33/24
(Continued)

FOREIGN PATENT DOCUMENTS

EP 3882588 A1 * 9/2021 .......... G01G 19/393
JP 4343937 B2 * 10/2009
(Continued)

OTHER PUBLICATIONS

The extended European search report issued by the European Patent Office on Oct. 14, 2024, which corresponds to European Patent Application No. 24173732.9-1001 and is related to U.S. Appl. No. 18/653,530.

*Primary Examiner* — Gene O Crawford
*Assistant Examiner* — Muhammad Awais
(74) *Attorney, Agent, or Firm* — Studebaker Brackett PLLC

(57) ABSTRACT

A combination weighing apparatus (1) includes: a distribution table (11) that rotates about a rotation shaft (X) to distribute articles (100) given from an outside in a radial direction; a plurality of radial feeders (20) that are arranged radially around the distribution table (11), receive the articles (100) discharged from the distribution table (11), and supply the articles (100) to corresponding hoppers, respectively; a drive unit (50) that is connected to the rotation shaft (X) and rotates the distribution table (11); an acquisition unit (51) that acquires information regarding a distribution state of the articles (100) in the distribution table (11) and the radial feeders (20); and a control unit (52) that controls the drive unit (50), wherein the control unit (52) controls the drive unit (50) based on the information regarding the distribution state of the articles (100) acquired by the acquisition unit (51) to change an acceleration applied to the article (100) on the distribution table (11) and move the article (100) on the distribution table (11) into a desired radial feeder (20).

6 Claims, 2 Drawing Sheets

(52) U.S. Cl.
CPC .. *B65G 2201/02* (2013.01); *B65G 2203/0258* (2013.01); *B65G 2203/041* (2013.01)

(56) References Cited

U.S. PATENT DOCUMENTS

| | | | | |
|---|---|---|---|---|
| 2001/0020553 | A1* | 9/2001 | Tamai | G01G 19/393 177/25.18 |
| 2002/0096370 | A1* | 7/2002 | Yonetsu | G01G 19/393 177/25.18 |
| 2010/0108404 | A1* | 5/2010 | Kieselhorst | G01G 19/393 177/25.18 |
| 2013/0186696 | A1* | 7/2013 | Broager | G01G 19/393 177/52 |
| 2015/0129323 | A1* | 5/2015 | Tamai | G01G 19/393 177/25.18 |
| 2016/0209263 | A1* | 7/2016 | Otoshi | G01G 19/393 |
| 2016/0341596 | A1* | 11/2016 | Hirose | G01G 19/393 |
| 2017/0211967 | A1* | 7/2017 | Otoshi | G01G 13/026 |
| 2017/0299423 | A1* | 10/2017 | Horitani | G01G 19/393 |
| 2017/0305679 | A1* | 10/2017 | Kageyama | B65G 27/32 |
| 2018/0283931 | A1* | 10/2018 | Otoshi | G01G 13/16 |
| 2019/0137323 | A1* | 5/2019 | Kawanishi | G01G 13/242 |
| 2019/0248606 | A1* | 8/2019 | Kishikawa | G01G 19/393 |
| 2020/0056932 | A1* | 2/2020 | Iwasa | B23Q 11/00 |
| 2020/0072655 | A1* | 3/2020 | Konishi | G01G 19/393 |
| 2020/0072656 | A1* | 3/2020 | Kamigaito | G01G 13/003 |
| 2020/0200587 | A1* | 6/2020 | Takeichi | G01G 13/18 |
| 2020/0225077 | A1* | 7/2020 | Kamigaito | G01G 19/387 |
| 2021/0010851 | A1* | 1/2021 | Kishikawa | G01G 21/28 |
| 2021/0102833 | A1* | 4/2021 | Yaoi | G01G 19/393 |
| 2021/0215529 | A1* | 7/2021 | Takeichi | G01G 19/393 |
| 2021/0284463 | A1* | 9/2021 | Kishikawa | G01G 13/006 |
| 2021/0285811 | A1* | 9/2021 | Miyamoto | G01G 13/026 |
| 2021/0293608 | A1* | 9/2021 | Horitani | G01G 21/23 |
| 2022/0081144 | A1* | 3/2022 | Tong | B65H 26/02 |
| 2022/0111988 | A1* | 4/2022 | Fujita | B65B 41/16 |
| 2022/0144539 | A1* | 5/2022 | Oda | B65D 88/28 |
| 2022/0146301 | A1* | 5/2022 | Kishikawa | G01G 19/393 |

FOREIGN PATENT DOCUMENTS

| | | | | | |
|---|---|---|---|---|---|
| JP | 6165544 | B2 | * | 7/2017 | |
| JP | 2018048836 | A | * | 3/2018 | |
| JP | 2021148543 | A | * | 9/2021 | |
| WO | WO-2004042335 | A1 | * | 5/2004 | G01G 19/393 |
| WO | WO-2013183647 | A1 | * | 12/2013 | B65G 27/32 |

* cited by examiner

COMBINATION WEIGHING APPARATUS

CROSS-REFERENCE TO RELATED APPLICATIONS

This application is based upon and claims the benefit of priority from Japanese Patent Application No. 2023-084175 filed on May 22, 2023 in Japan, the entire contents of which are incorporated herein by reference.

TECHNICAL FIELD

The present invention relates to a combination weighing apparatus.

BACKGROUND ART

Conventionally, there is known a combination weighing apparatus that moves an article on a distribution portion in an outer circumferential direction by intermittently rotating the distribution portion at a high speed while rotating the distribution portion at a low speed, the distribution portion distributing the article in the outer circumferential direction.

SUMMARY OF THE INVENTION

However, the combination weighing apparatus described above has a problem that the article on the distribution portion cannot be efficiently supplied in a targeted manner to a radial feeder in which the article is insufficient.

The present invention has been made in view of the above problems, and an object of the present invention is to provide a combination weighing apparatus capable of efficiently supplying an article to a radial feeder to increase an operation rate.

A weighing apparatus according to an embodiment includes: a distribution table that rotates about a rotation shaft to distribute articles given from an outside in a radial direction; a plurality of radial feeders that are arranged radially around the distribution table, receive the articles discharged from the distribution table, and supply the articles to corresponding hoppers, respectively; a drive unit that is connected to the rotation shaft and rotates the distribution table; an acquisition unit that acquires information regarding a distribution state of the articles in the distribution table and the radial feeders; and a control unit that controls the drive unit, wherein the control unit controls the drive unit based on the information regarding the distribution state of the articles acquired by the acquisition unit to change an acceleration applied to the article on the distribution table and move the article on the distribution table into a desired radial feeder.

According to the present invention, it is possible to provide a combination weighing apparatus capable of efficiently supplying an article to a radial feeder to increase an operation rate.

DESCRIPTION OF EMBODIMENTS

Preferred embodiments of the present invention will be described in detail below with reference to the accompanying drawings. Note that, in the following drawings, the same or similar parts are denoted with the same or similar reference signs. It should be noted that the drawings are schematic and, for example, the ratio between each dimension is different from the real. Therefore, for example, specific dimensions should be understood in consideration of the following descriptions. In addition, parts between each drawing may be different in dimensional relationship or dimensional ratio. In the present specification and the drawings, constituents substantially identical in function or configuration are denoted with the same reference signs and thus duplicate descriptions thereof will be omitted. In addition, any constituents not directly related to the present invention are not illustrated.

First Embodiment

Figure 1:
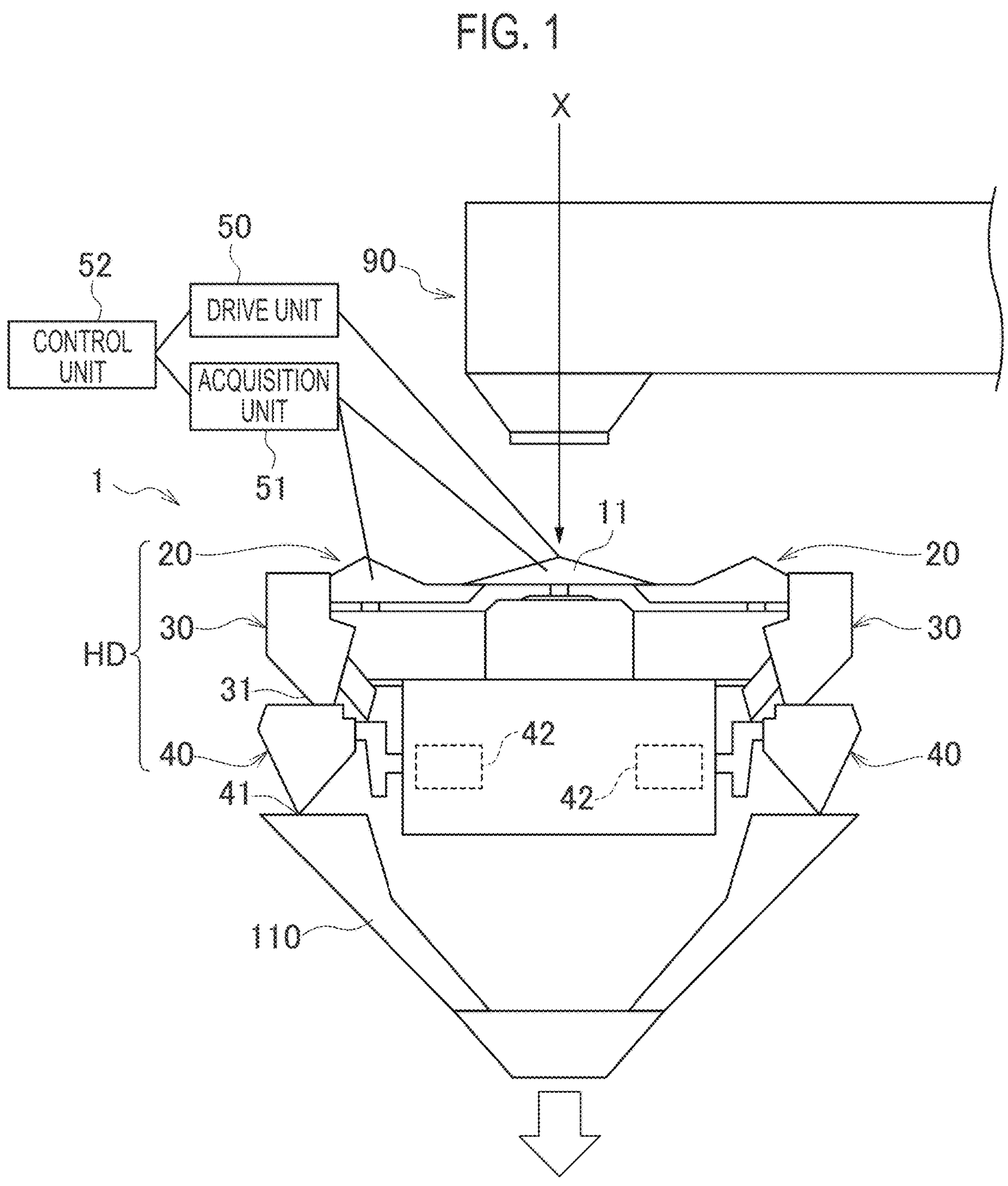
FIG. 1 is a diagram illustrating an example of an overall configuration of a combination weighing apparatus according to a first embodiment.
Figure 2:
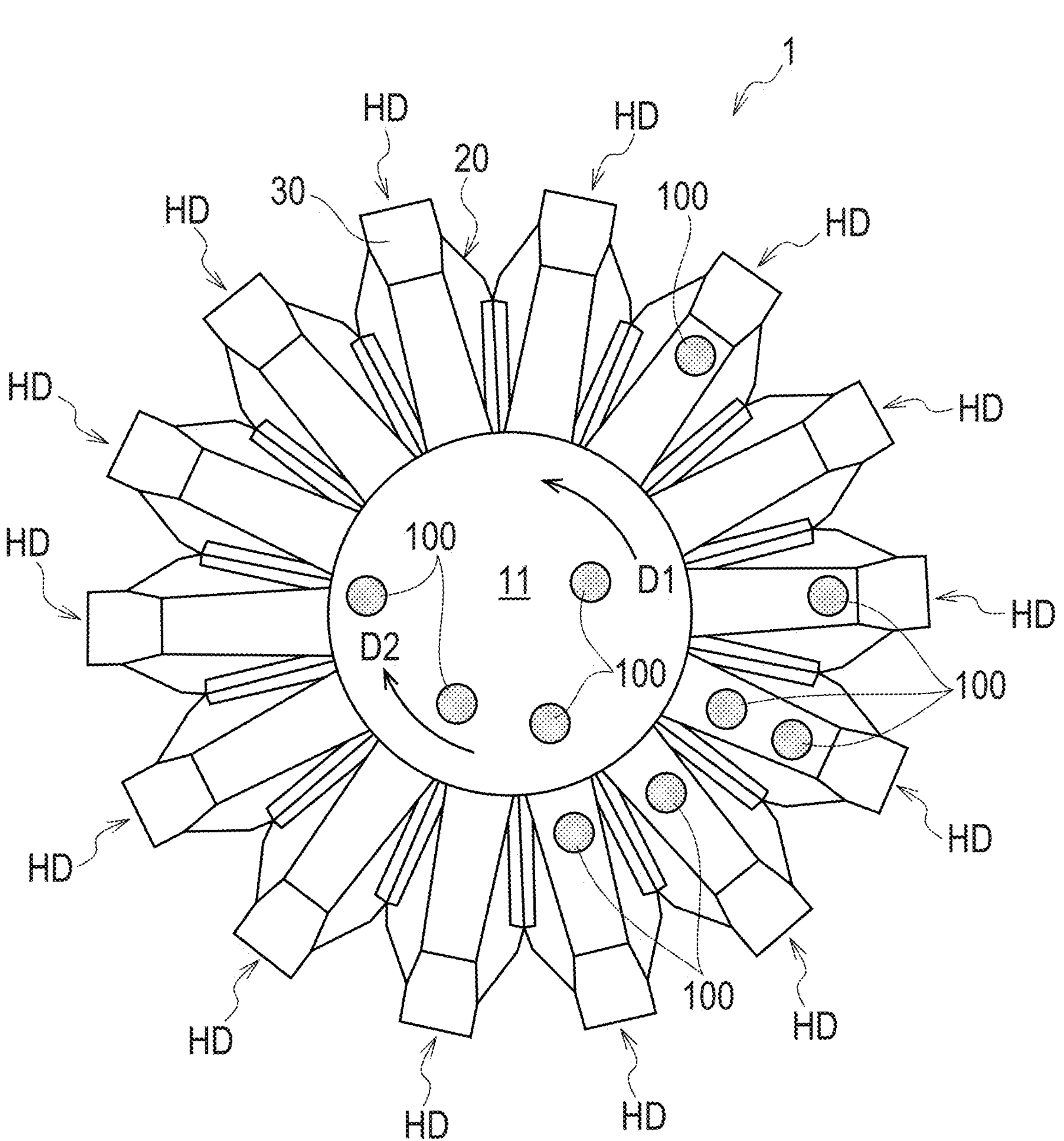
FIG. 2 is a diagram for describing an example of a distribution state of articles in the combination weighing apparatus according to the first embodiment.

Hereinafter, a combination weighing apparatus 1 according to a first embodiment of the present invention will be described with reference to FIGS. 1 and 2. FIG. 1 is a diagram illustrating an example of an overall configuration of the combination weighing apparatus 1 according to the present embodiment, and FIG. 2 is a diagram for describing an example of a distribution state of articles 100 in the combination weighing apparatus 1 according to the present embodiment.

The combination weighing apparatus 1 according to the present embodiment is an apparatus that weighs a weight of the article 100 held by each of a plurality of weighing hoppers 40 and performs combination calculation based on a weighing value. The combination weighing apparatus 1 selects a combination of the articles 100 of which a result of the combination calculation is a value within a predetermined allowable range, and discharges the articles from the weighing hopper 40 related to the combination of the articles.

As illustrated in FIG. 1, the combination weighing apparatus 1 according to the present embodiment includes a distribution table 11, a plurality of radial feeders 20, a plurality of pool hoppers 30, the plurality of weighing hoppers 40, a collection discharge chute 110, a drive unit 50, an acquisition unit 51, and a control unit 52.

Here, the radial feeder 20 on an upper side, the pool hopper 30 on a middle side, and the weighing hopper 40 on a lower side form one head HD as illustrated in FIG. 1. In the combination weighing apparatus 1 according to the present embodiment, for example, it is assumed that 14 heads HD including the radial feeder 20, the pool hopper 30, and the weighing hopper 40 are arranged in a circle around the distribution table 11 as illustrated in FIG. 2.

The distribution table 11 rotates about a rotation axis X to distribute the articles 100 given from the outside (for example, an article supply unit 90) in a radial direction. The drive unit 50 is connected to a rotation shaft of the distribution table 11 and rotates the distribution table 11.

The pool hopper 30 temporarily holds the article 100 supplied from the radial feeder 20, and then discharges the held article 100 to the weighing hopper 40. The pool hopper 30 is disposed on an outer edge side of the radial feeder 20.

The pool hopper 30 is disposed below the radial feeder 20 in such a way as to receive the article 100 falling from the radial feeder 20. Specifically, the pool hopper 30 belonging to each head HD is disposed below the outer edge side of the radial feeder 20 belonging to the same head HD.

The pool hopper 30 has openings at upper and lower ends. The upper end opening receives the article 100 falling from the radial feeder 20. An openable and closable gate 31 is attached to the lower end opening. When the gate 31 is opened, the article 100 held by the pool hopper 30 falls into the weighing hopper 40.

The weighing hopper 40 weighs the article 100 supplied from the pool hopper 30, and then discharges the weighed article 100 to the collection discharge chute 110. The weighing hopper 40 is disposed immediately below the pool hopper 30 in such a way as to receive the article 100 falling from the pool hopper 30. Specifically, the weighing hopper 40 belonging to each head HD is disposed immediately below the pool hopper 30 belonging to the same head HD.

The weighing hopper 40 has openings at upper and lower ends. The upper end opening is an opening for receiving the article 100 discharged from the pool hopper 30. An openable and closable gate 41 is attached to the lower end opening. When the gate 41 is opened, the article 100 held by the weighing hopper 40 falls into the collection discharge chute 110.

Each of the weighing hoppers 40 is supported by a load cell 42. The article 100 held by the weighing hopper 40 is weighed by the load cell 42.

The collection discharge chute 110 collects the article 100 discharged from the weighing hopper 40 and discharges the article 100 to the outside of the combination weighing apparatus 1.

The acquisition unit 51 acquires information regarding the distribution states of the articles 100 in the distribution table 11 and the radial feeders 20.

For example, as illustrated in FIG. 2, the acquisition unit 51 acquires, as the information regarding the distribution state of the articles 100 in the radial feeders 20, information regarding how many articles 100 are present at which positions in the radial feeders 20.

Similarly, as illustrated in FIG. 2, the acquisition unit 51 acquires, as the information regarding the distribution state of the articles 100 in the distribution table 11, information regarding how many articles 100 are present at which positions in the distribution table 11 for each radial feeder 20.

Here, the acquisition unit 51 may include at least one of a sensor or a camera.

For example, the acquisition unit 51 may include at least one of a photoelectric sensor, a displacement sensor, or a distance sensor as the sensor. Such a sensor may be provided in the vicinity of the distribution table 11, in the vicinity of each radial feeder 20, or in the vicinity of a boundary between the distribution table 11 and the radial feeder 20.

The acquisition unit 51 may calculate the information regarding the distribution state of the article 100 based on information acquired by each sensor.

In a case where the acquisition unit 51 includes a camera, the camera may be provided above the distribution table 11 and the radial feeder 20. As a result, such a camera can capture an image as illustrated in FIG. 2. Such an image may be a black-and-white pattern.

The acquisition unit 51 may calculate the information regarding the distribution state of the article 100 described above based on the image captured by the camera.

The control unit 52 controls the drive unit 50. Specifically, the control unit 52 controls the drive unit 50 based on the information regarding the distribution state of the articles 100 acquired by the acquisition unit 51 to change an acceleration applied to the article 100 on the distribution table 11 and move the article 100 on the distribution table 11 into a desired radial feeder 20.

For example, the control unit 52 may control the drive unit 50 to move the article 100 (alternatively, a mass of the articles 100) on the distribution table 11 to a position corresponding to the radial feeder 20 having a small number of articles 100 based on the information regarding the distribution state of the article 100 described above, and discharge the article 100 to the radial feeder 20 at such a position.

Here, the control unit 52 may change the acceleration applied to the article 100 on the distribution table 11 by combining deceleration and acceleration of a rotation speed of the distribution table 11. Furthermore, the control unit 52 may change the acceleration applied to the article 100 on the distribution table 11 by switching a rotation direction of the distribution table 11 between a forward direction D1 and a reverse direction D2.

Furthermore, the control unit 52 may change the acceleration applied to the article 100 on the distribution table 11 by combining deceleration and acceleration of the rotation speed of the distribution table 11 and switching of the rotation direction of the distribution table 11.

For example, the control unit 52 can decelerate the rotation speed of the distribution table 11 in the forward direction D1 and then switch the rotation direction of the distribution table 11 to the reverse direction D2 to most reliably discharge the article 100 on the distribution table 11 to the radial feeder 20.

With such a configuration, the article 100 can be efficiently supplied to each of the plurality of radial feeders 20, and the operation rate of the combination weighing apparatus 1 can be increased.

Specifically, since the article 100 moves toward the radial feeder 20 by the rotation of the distribution table 11 when the acceleration is applied to the article 100, the control unit 52 can discharge the article 100 from the distribution table 11 to the radial feeder 20 by controlling a rotation start timing for the distribution table 11 that is stopped and a rotation stop timing for the distribution table 11 that is rotating.

Therefore, the control unit 52 recognizes images of the articles 100 on the distribution table 11 and the radial feeders 20, grasps the distribution state of the articles 100, rotates a region where the article 100 is on the distribution table 11 to approach the vicinity of the radial feeder 20 without the article 100, and then suddenly stops or suddenly accelerates the distribution table 11, so that the article 100 can be discharged to a desired radial feeder 20.

As a result, the article 100 can be efficiently supplied to the radial feeder 20 having a small number of articles 100, and the operation rate of the combination weighing apparatus 1 can be increased.

With this configuration, the article 100 can be stored on the distribution table 11 and then supplied to the radial feeder 20 having a small number of articles 100. As a result, the empty head HD to which no article is supplied can be eliminated, the operation rate of the combination weighing apparatus 1 can be increased, so that a yield can be improved.

Furthermore, the control unit 52 may change the acceleration applied to the article 100 on the distribution table 11 according to the above-described information regarding the distribution state of the articles 100 and a type of the article 100.

A static friction coefficient between the distribution table 11 and the article 100 varies depending on the type of the article 100. Therefore, with the configuration described above, it is possible to more efficiently discharge the article 100 to the radial feeder 20 having a small number of articles 100 by changing the acceleration applied to the article 100 on the distribution table 11 in consideration of the type of the article 100 in addition to the information regarding the distribution state of the articles 100 described above.

The present invention has been described in detail with the embodiments above. It is obvious to those skilled in the art that the present invention is not limited to the embodiments in the present specification. The present invention can be carried out in aspects modified and altered without departing from the gist and scope of the present invention in the claims. Therefore, the present specification is intended for exemplificative description and thus does not have any limitative meanings to the present invention.

What is claimed is:

1. A combination weighing apparatus comprising:

a distribution table that rotates about a rotation shaft to distribute articles given from an outside in a radial direction;

a plurality of radial feeders that are arranged radially around the distribution table, receive the articles discharged from the distribution table, and supply the articles to corresponding hoppers, respectively;

a drive unit that is connected to the rotation shaft and rotates the distribution table;

an acquisition unit that acquires information regarding a distribution state of the articles in the distribution table and the radial feeders; and a control unit that controls the drive unit, wherein the control unit, based on the information regarding the distribution state of the articles acquired by the acquisition unit, rotates the distribution table until an area of the distribution table containing the articles is proximal a desired radial feeder of the plurality of radial feeders, the desired radial feeder being identified responsive to a number of articles in the desired radial feeder based on the information regarding the distribution state, and the control unit controls the drive unit to move the articles from the area of the distribution table into the desired radial feeder.

2. The combination weighing apparatus according to claim 1, wherein the control unit controls the drive unit according to the information regarding the distribution state of the articles and a type of the articles.

3. The combination weighing apparatus according to claim 1, wherein the acquisition unit includes at least one of a sensor or a camera, and the acquisition unit is configured to acquire information regarding positions of the articles on the distribution table and a number of the articles at the positions, and information regarding a number of the articles in each of the plurality of radial feeders.

4. The combination weighing apparatus according to claim 1, wherein the control unit controls the drive unit by combining deceleration and acceleration of a rotation speed of the distribution table and switching the rotation direction of the distribution table.

5. The combination weighing apparatus according to claim 1, wherein the number of articles in the desired radial feeder is zero.

6. The combination weighing apparatus according to claim 1, wherein the number of articles in the desired radial feeder is a small number.

* * * * *